(12) United States Patent
Camarota

(10) Patent No.: US 6,186,645 B1
(45) Date of Patent: Feb. 13, 2001

(54) FLEXIBLE LIGHTING SYSTEM AND MOUNTING ARRANGEMENT

(75) Inventor: Richard J. Camarota, Holland, MI (US)

(73) Assignee: ITC, Inc., Holland, MI (US)

( * ) Notice: Under 35 U.S.C. 154(b), the term of this patent shall be extended for 0 days.

(21) Appl. No.: 09/256,619

(22) Filed: Feb. 23, 1999

Related U.S. Application Data

(63) Continuation-in-part of application No. 08/805,046, filed on Feb. 24, 1997, now Pat. No. 5,934,792.

(51) Int. Cl.$^7$ ................................................. F21V 21/00
(52) U.S. Cl. .......................... 362/249; 362/240; 362/396
(58) Field of Search ................................... 362/249, 240, 362/396, 806, 250

(56) References Cited

U.S. PATENT DOCUMENTS

| | | | |
|---|---|---|---|
| 5,438,804 | * | 8/1995 | Reum et al. ...................... 362/249 X |
| 5,707,136 | * | 1/1998 | Byers ................................ 362/396 X |
| 5,934,792 | * | 8/1999 | Camarota ............................. 362/240 |

* cited by examiner

Primary Examiner—Stephen Husar
(74) Attorney, Agent, or Firm—Raphael A. Monsanto; Benita J. Rohm; Richard A. Gaffin

(57) ABSTRACT

A flexible lighting system and method of making same. The flexible lighting system includes a flexible translucent rod and an attachment flange. Preferably, the outer casing and the attachment flange are integrally formed to facilitate installation. The flexible translucent rod includes an outer casing and a lighting core. The lighting core is disposed within an axial aperture defined by the outer casing and contains a series of lighting elements. In the preferred embodiment, a texture, such as axial grooves, is applied to a surface of the flexible translucent rod. This texture is applied to the outer surface of the lighting core or the inner surface of the outer casing to diffuse the light emitted by the discrete lighting elements, thereby providing an appearance similar to a solid bar of light. A mounting arrangement is provided for engaging the flexible translucent rod, or a coupler portion thereof, and is arranged to facilitate coupling of the flexible lighting system to a mounting surface. The mounting surface may be penetrable, such as ground soil, unhardened building material, or the like. The mounting arrangement includes, in such a penetrable surface application, an elongated web that penetrates the mounting surface. Security of the mounting is enhanced by a transverse flange disposed along the elongated web. In an arrangement where the flexible translucent rod has an attachment portion, a correspondingly configured mounting channel is provided, the mounting channel having a base portion that is provided with a mounting facility, such as an adhesive layer or apertures for fasteners.

9 Claims, 4 Drawing Sheets

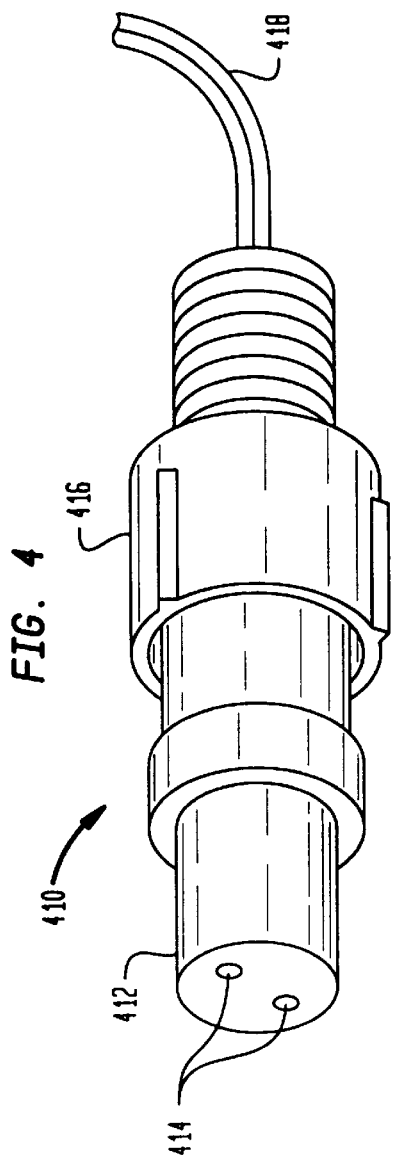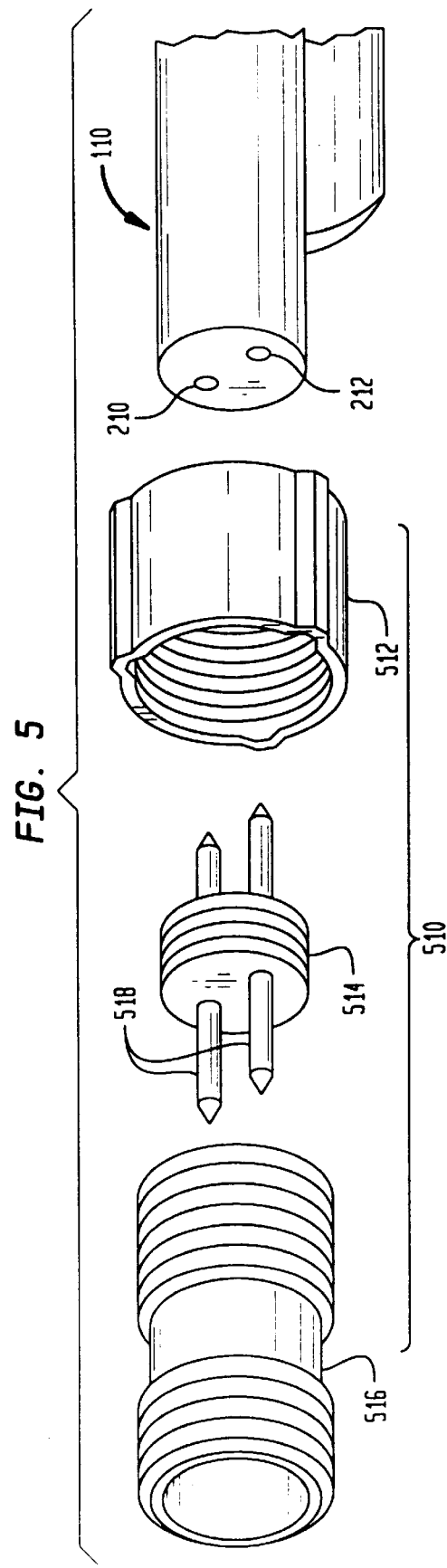

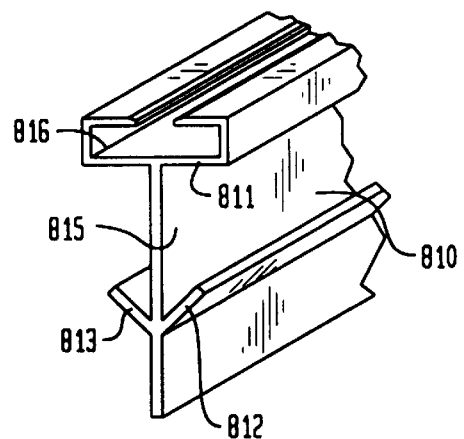
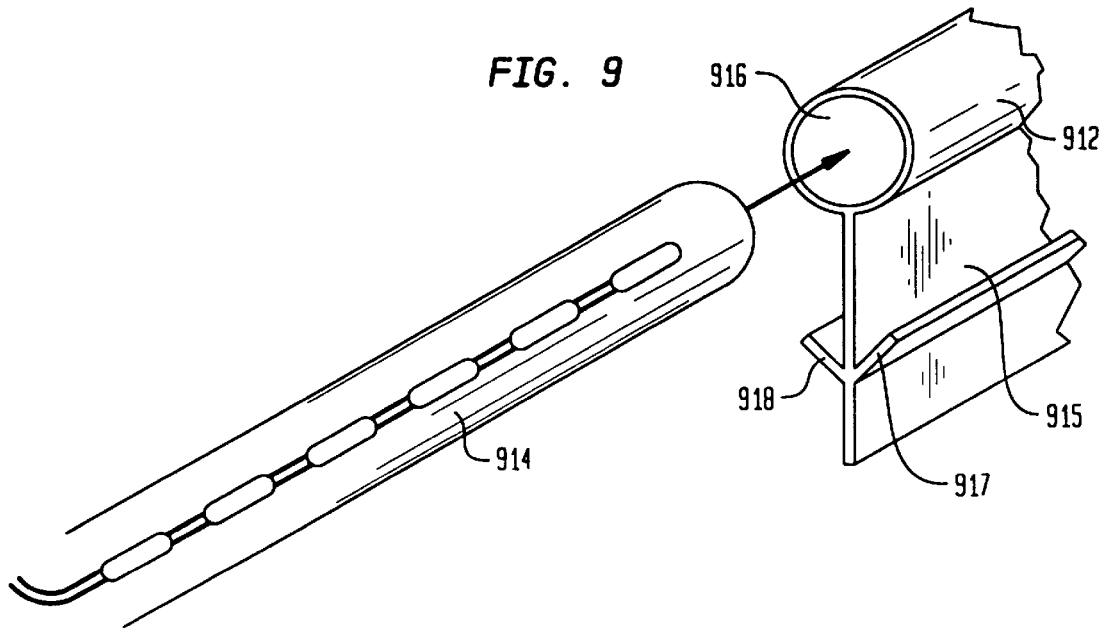

FLEXIBLE LIGHTING SYSTEM AND MOUNTING ARRANGEMENT

RELATIONSHIP TO OTHER APPLICATION

This application is a continuation-in-part of U.S. patent application Ser. No. 08/805,046, filed Feb. 24, 1997, now U.S. Pat. No. 5,934,792 the disclosure of which is incorporated herein in its entirety by reference.

BACKGROUND OF THE INVENTION

1. Field of the Invention

The present invention relates generally to flexible lighting systems, and more specifically, to a flexible lighting system that can be bent and folded to accommodate a variety of surfaces and that can be installed more efficiently than prior art flexible lights.

2. Description of the Related Art

Flexible lighting strips or rods have been known for many years. Typical applications for such flexible lighting include: interior and exterior trim for recreational vehicles, trim for boats, showcase and display lighting, and aircraft emergency pathway illumination.

One typical flexible lighting strip, disclosed by Anquentin in U.S. Pat. No. 4,107,767, is comprised of an elongated section of transluscent plastic material having a portion formed as a cylindrical duct that houses a chain of electric lamps. At one end of the cylindrical duct, a pair of conductors is exposed for energizing the electric lamps. The cylindrical duct is filled with a translucent polymerizable compound that fixes the relative position of the chain of electric lamps within the cylindrical duct. Such a flexible lighting strip is preferably mounted to a support, such as a showcase, using double-sided adhesive tape.

A typical flexible lighting rod, disclosed by Lin in U.S. Pat. No. 4,607,317, consists of a molded or extruded, bendable and foldable bulb-holding bar body made of polyvinyl-chloride ("PVC") or similar plastic, two conducting wires and a plurality of conductive plugs connected with a plurality of small bulbs spaced with suitable pitch in series. The foremost and terminal bulbs of each set of bulbs are connected to the two conducting wires. This flexible lighting rod is typically mounted to a support using brackets or similar fasteners.

Notwithstanding the aforementioned known flexible lighting strips and rods, there is a need for an improved flexible lighting system. Specifically, there is a need for a flexible lighting system that provides greater efficiency, flexibility and precision in mounting. An improved mounting alternative facilitates installation and promotes use of the improved flexible lighting system. There is also a need for a method of making a flexible lighting system that not only facilitates installation but also provides a light source that is distributed throughout the length of a lighting rod, thereby reducing the segmented appearance of the discrete lighting elements and providing more of an appearance of a solid bar of light.

SUMMARY OF THE INVENTION

OBJECTS OF THE INVENTION

It is an object of the present invention to provide a flexible lighting system that provides improved efficiency, flexibility and precision of installation over the prior art.

It is another object of the present invention to provide a method of manufacturing a flexible lighting system that produces a flexible lighting system providing more efficient, flexible and precise installation than the prior art.

It is a further object of the present invention to provide a method of manufacturing a flexible lighting system that produces a flexible lighting system that provides a light source that distributes light throughout the length of a lighting rod.

SUMMARY OF THE INVENTION

In carrying out the above objects and other objects of the present invention, a flexible lighting system is provided including a flexible translucent lighting rod and an attachment flange. The flexible translucent lighting rod includes an outer casing and an inner lighting core. The inner lighting core contains a plurality of lighting elements. The attachment flange is axially connected to the outer casing of the flexible translucent lighting rod and facilitates efficient, flexible and precise installation of the flexible lighting system. Preferably, the flexible translucent lighting rod and the attachment flange of the flexible lighting system are integrally formed.

In the preferred embodiment of the disclosed flexible lighting system, the light emitted from the lighting elements is distributed throughout the length of the lighting rod. This can be accomplished, using a textured surface, such as a surface employing axial grooves along the length of the flexible lighting rod.

In further carrying out the above objects and other objects of the present invention, a method of making a flexible lighting system is disclosed comprising the steps of extruding an inner lighting rod core and extruding an outer casing for the inner lighting core. The inner lighting core is formed of flexible translucent material and contains a series of lighting elements. The outer casing is also formed of flexible translucent material and includes an attachment flange to facilitate installation. Preferably, a texture is applied to a surface of the flexible lighting system to diffuse light emitted by the series of lighting elements. The texture, illustratively in the form of axial grooves, can be applied to either the outer surface of the inner lighting core or the inner surface of the outer casing.

It is an advantage of the present invention is the appearance of a solid bar of light. This results in a more attractive appearance as well as a more even distribution of light on an illuminated subject.

It is a further advantage of the present invention to provide efficient installation of the flexible lighting rod. This advantage is possible because the attachment flange can easily be mounted using common fasteners such as tacks, staples, nails and screws.

In another embodiment of the invention, the flexible lighting system further includes a mounting receptacle. In one embodiment, the attachment flange, which may be integrally formed with the flexible translucent lighting rod, or outer casing of the rod, is configured in a shape that mates with a mounting receptacle. The attachment flange can, in this embodiment, be inserted into the mounting receptacle by sliding it into place, or depending on the shape of the flange, snapping it into a compression fit. In a preferred embodiment, the configured flange has a T-shape.

The mounting receptacle can be either flexible or rigid. In some embodiments, the mounting receptacle also includes mounting, or anchoring, means to aid in affixing the mounting receptacle into or onto a surface. In one embodiment, for example, the mounting receptacle is formed of a flexible plastic or malleable metal, to conform readily to the contours of an item to which it is to be attached. In another embodiment, the mounting receptacle is formed of a rigid plastic, or metal, and in an advantageous embodiment of the invention, is of pre-formed shaped (such as a Christmas decoration) or cut to fit. Conventional fasteners, such as screws or tacks, can be used to affix the mounting receptacle to the item. In some embodiments, such as where the flange is T-shaped and the mounting receptacle has a generally u-shaped configuration to accommodate the T-shaped flange, with a planar bottom surface and vertical opposed sides, the mounting receptacle can be affixed to the item with tacks, for example, through its planar bottom surface. Of course, apertures can be provided in the mounting strip to facilitate placement of the fastening means. When the flexible translucent lighting rod is inserted into the mounting receptacle, it obscures the fastening means used to affix the mounting receptacle to the item. Therefore, in addition to ease of installation, the lighting rod and mounting receptacle or the present invention have an aesthetically pleasing appearance when installed.

In another preferred embodiment, the mounting receptacle further includes a means to facilitate attachment of the mounting receptacle into or onto a surface. Illustratively, the means to facilitate attachment is an integrally formed flange or web. In one preferred embodiment, the mounting receptacle, which is configured to accommodate the mounting flange of the flexible lighting rod, is provided with an integrally formed web that is adapted to penetrate the earth, such as along the perimeter of a garden. In an alternative embodiment, the outer casing of the flexible lighting system, which is configured to accommodate and protect the lighting core, comprises a relatively rigid plastic and the attachment flange is an integrally formed web. The web is provided with upward-directed flanges that serve to reduce the likelihood that the arrangement will inadvertently be pulled from the ground. In these embodiments, the web is substantially coextensive with the mounting receptacle.

The objects, features and advantages of the present invention are readily apparent from the following description of the preferred embodiments when taken in connection with the accompanying drawings.

BRIEF DESCRIPTION OF THE DRAWINGS

Comprehension of the invention is facilitated by reading the following detailed description, in conjunction with the annexed drawings, in which:

FIG. 4 is a perspective view of the power connector for the flexible lighting system;

FIG. 5 is an exploded perspective view of the power source receptor for the flexible lighting system;

FIG. 8 is an isometric view of an alternative mounting receptacle for the flexible lighting rod of FIG. 6 that is useful for defining the perimeter of a garden, for example; and FIG. 9 is an isometric view of alternative embodiment of the invention wherein the outer casing of the flexible lighting system is relatively rigid.

DETAILED DESCRIPTION

Figure 1:
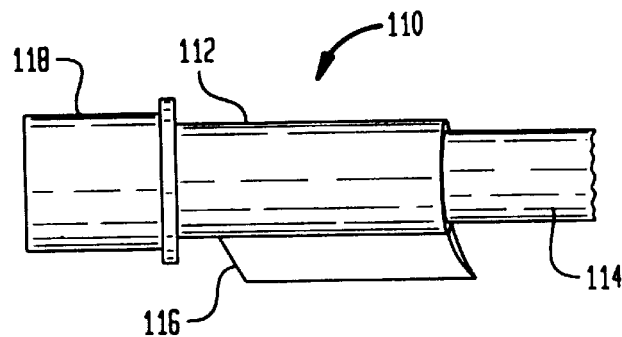
FIG. 1 is a partial longitudinal sectional view of a flexible lighting rod having an attachment flange.

Referring now to the drawing figures, FIG. 1 shows a partial longitudinal sectional view of a flexible lighting system 110 in accordance with the present invention. System 110 includes an outer casing 112, an inner lighting core 114 disposed within outer casing 112, an attachment flange 116 attached to the outer casing 112 and an end cap 118 for terminating an end of flexible lighting system 110.

Outer casing 112 consists of an extruded flexible translucent material such as PVC or similar plastic. In some embodiments, however, such as described with respect tot FIG. 9, the outer casing in this embodiment is formed of a relatively rigid material. The appropriate diameter and thickness of outer casing 112 depends upon the intended use of the flexible lighting system. Typical applications call for outer casing diameters of ½ inch or ⅜ inch. Attachment flange 116 is integrally formed of outer casing 112 allowing outer casing 112 to not only cover and protect lighting core 114, but also facilitate easy installation. Installation of flexible lighting system 110 can be accomplished using standard fasteners including staples, tacks, nails and screws among others. The ability to use standard fasteners during installation is a significant advantage over the prior art for at least two reasons: First, because the flexible lighting system of the present invention is typically used in applications such as recreational vehicle trim, boat trim and showcase display unit lighting, the flexible lighting rods must often be installed in positions and along surfaces that make installation difficult. Second, the flexible lighting system of the present invention is typically installed by unskilled laborers and hobbyists.

Like outer casing 112, inner lighting core 114 consists of an extruded flexible translucent material such as PVC or similar plastic. As shown in FIG. 1, inner lighting core 114 includes an outer surface having a texture of axial grooves. This or another texture can be applied during the extrusion process.

Figure 2:
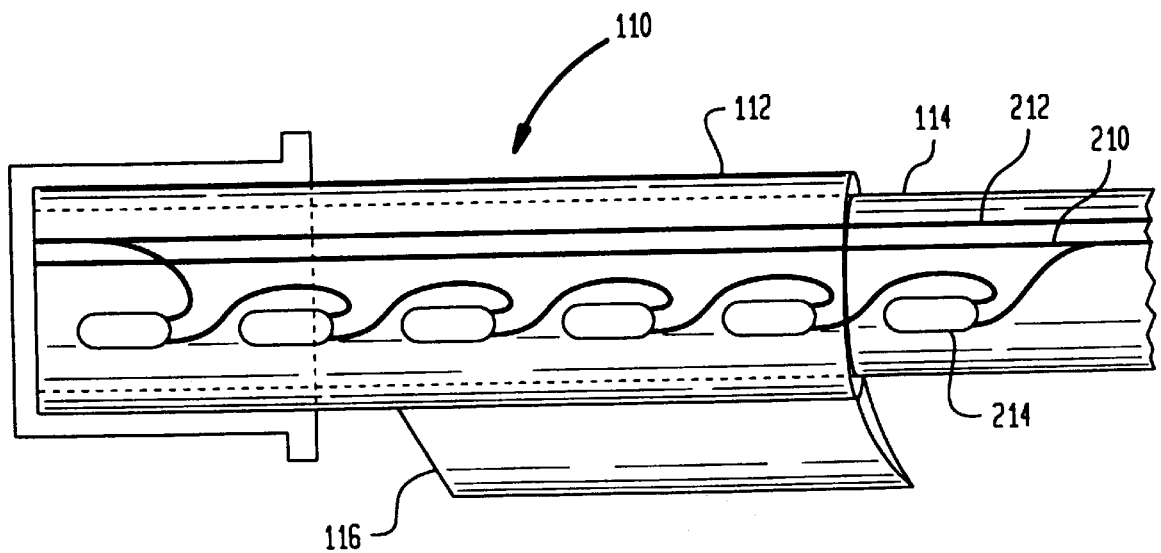
FIG. 2 is a longitudinal sectional view of the embodiment of FIG. 1.

Referring now to FIG. 2, inner lighting core 114 includes two substantially parallel electrical conductors of suitable grade 210 and 212 that span the portion of the flexible lighting system that is to be illuminated. Inner lighting core 114 further includes a number of electrical light bulbs 214 connected to electrical conductors 210 and 212. Although the electrical light bulbs of FIG. 2 are shown connected to electrical conductors 210 and 212 in series, the could easily be connected in another fashion, such as in parallel. In fact, the two methods of connecting the electrical light bulbs 214 could be combined to provide a flexible lighting system that in this embodiment is cut to lengths based on the intended application of the flexible lighting system. In such an embodiment, sets of electrical light bulbs 214 spanning, for example 18 inches, is connected in series so that the translucent rod and inner lighting rod of the flexible lighting system in this embodiment is cut at certain 18 inch intervals without destroying the electrical integrity of the flexible lighting system. The ability to cut the system to a desired length renders the flexible lighting system more versatile and provides the ability to apply the system to a larger variety of applications.

Figure 3:
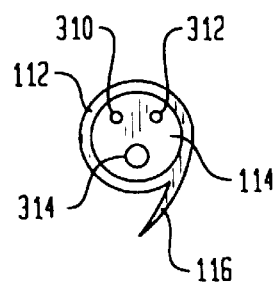
FIG. 3 is a transverse sectional view of the embodiment of FIG. 1.

Referring now to FIG. 3, there is shown a transverse sectional view of the flexible lighting system in accordance with the present invention. As shown, inner lighting core 114 is positioned within outer casing 112. Inner lighting core 114 includes apertures 310 and 312 for retaining electrical conductors 210 and 212 (not shown), and aperture 314 for retaining electrical light bulbs 214 (not shown).

Referring now to FIG. 4, there is shown a perspective view of the power connector 410 for the flexible lighting system. Power connector 410 includes female plug 412 having two receptacles 414 for receiving and conducting power to conductive pins 518 described with reference to FIG. 5. Power connector 410 further includes compression collar 416 to provide threaded attachment to barrel fitting 516 of power source receptor 510 described with reference to FIG. 5. Finally, power connector 410 includes power cord 418 having two conductors in electrical communication with receptacles 414.

Referring now to FIG. 5, there is shown power source receptor 510 for allowing flexible lighting system 110 to receive electrical power. Power source receptor 510 includes compression collar 512, conductive insert 514 and barrel/compression fitting 516. Compression collar 512 is slipped onto the flexible lighting rod of flexible lighting system 110 with the threaded end disposed so as to receive the slotted end of barrel/compression fitting 516 and retain conductive insert 514. Conductive insert 514 is inserted into the end of the flexible lighting rod so that the sharp ends of conductive pins 518 provide electrical connection with electrical conductors 210 and 212.

Figure 6:
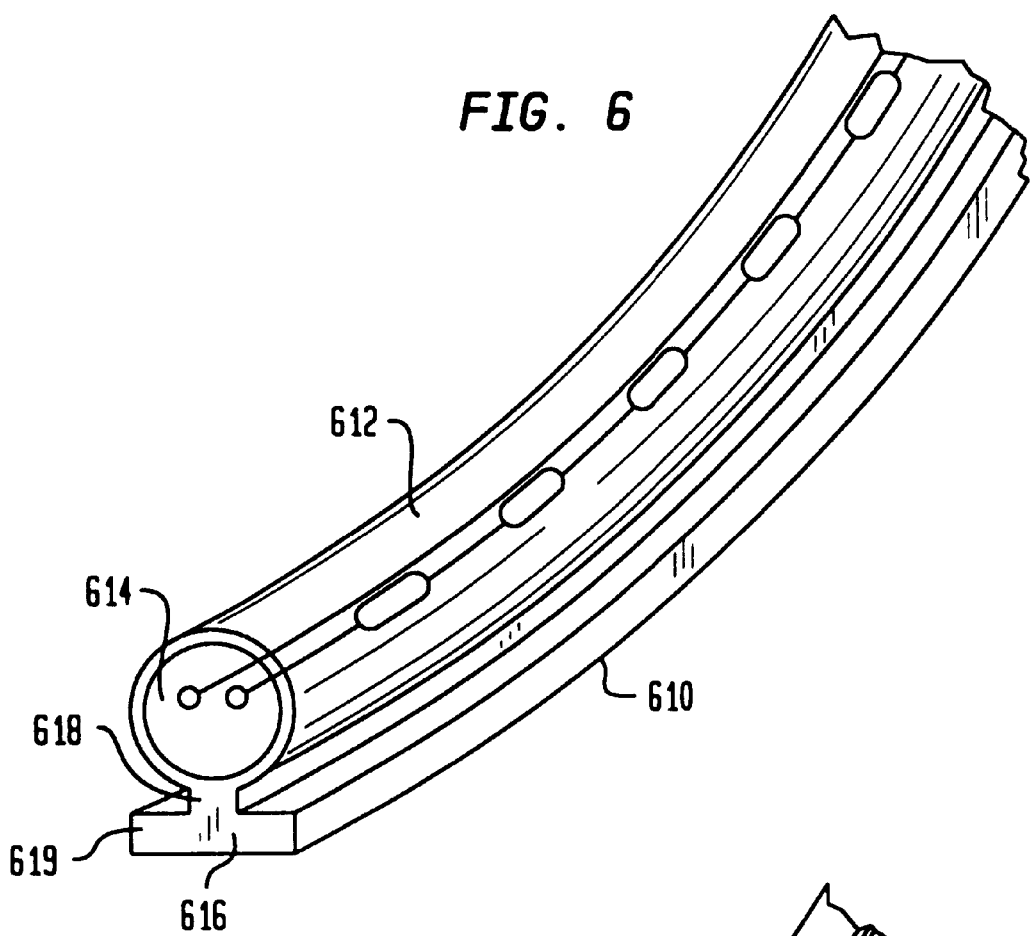
FIG. 6 is an isometric view of a flexible lighting rod with a T-shaped flange in a preferred embodiment of the flexible lighting system of the present invention.
Figure 7:
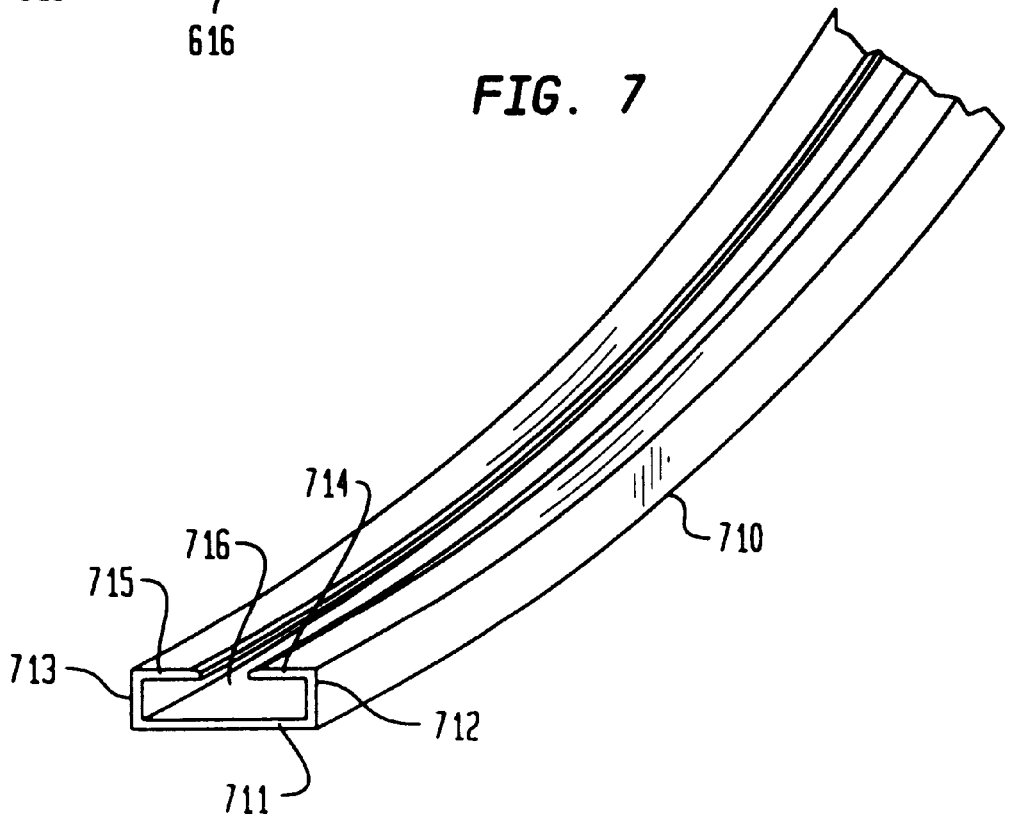
FIG. 7 is an isometric view of a mounting receptacle that mates with the flexible lighting rod shown in FIG. 6.

FIGS. 6 and 7 illustrate a flexible lighting system in accordance with the present invention that further includes a mounting receptacle adapted to receive a flexible translucent lighting rod of the type described hereinabove. In FIG. 6, flexible lighting rod 610 comprises an inner lighting core 614 and outer casing 612 with T-shaped attachment flange 616 which, in this embodiment, is integrally formed with the outer casing 612. Attachment flange 616 mates with a mounting receptacle, such as mounting receptacle 710 shown in FIG. 7. Mounting receptacle 710 has a generally unshaped channel 716 with a planar base 711 and vertical sides 712 and 713 sized to accommodate rectangular attachment portion 619 of T-shaped flange 616. Vertical sides 712 and 713 have inwardly directed securing flanges 714 and 715, respectively, which are separated by a distance approximately equal to neck portion 618 of T-shaped attachment flange 616.

Mounting receptacle 710 in this embodiment is installed on a surface by adhesive, or other conventional fastening means, such as nails or screws, through planar base 711. Flexible lighting rod 610 is installed on mounting receptacle 710 by inserting attachment flange 616 into channel 716 of the mounting receptacle such as by sliding it into place or, depending on the flexibility of the plastic comprising the outer casing 612, by snapping it into place.

In another embodiment of the invention, as shown in FIG. 8, mounting receptacle 810 comprises a garden edger. Mounting receptacle 810 has a generally unshaped channel 816, analogous to the unshaped channel of the mounting receptacle shown in FIG. 7, which is adapted to receive the T-shaped flange of flexible lighting rod 610 shown in FIG. 6. Mounting receptacle 810 may, in this embodiment, be formed of a relatively rigid plastic suitable for penetrating earth. Mounting receptacle 810 has an attachment means, which in this embodiment, is web 815. Web 815 depends orthogonally from planar base 811 of channel 816 and is substantially coextensive with the channel over the length of the mounting receptacle. In this embodiment, web 815 is formed integrally with the members comprising the channel and further includes upwardly directed flanges 812 and 813 to assist in securing the garden edger in the earth.

In an alternative embodiment, also in the form of a garden edger, shown in FIG. 9, outer casing 912 of a flexible lighting rod in accordance with the invention is formed of a relatively rigid, translucent material suitable for penetrating the earth. Web 915 is formed integrally with outer casing 912. Inner lighting core 914 is slidingly accommodated within bore 916 of outer casing 912. Web 915 is, in this embodiment, provided with upwardly directed flanges 917 and 918.

Although the invention has been described in terms of specific embodiments and applications, persons skilled in the art can, in light of this teaching, generate additional embodiments without exceeding the scope or departing from the spirit of the claimed invention. For example, the shape of the attachment flange is illustrative only. Moreover, the embodiment wherein the mounting receptacle or outer casing of the flexible lighting rod comprises a garden edger is illustrative only and indicative of the many possible lighting arrangements that can be devised. Accordingly, it is to be understood that the drawing and description in this disclosure are proffered to facilitate comprehension of the invention, and should not be construed to limit the scope thereof.

What is claimed is:

1. A flexible lighting arrangement for attachment to a mounting surface, the flexible lighting arrangement comprising:

a plurality of lighting elements arranged in sequence along a predetermined lighting path, said lighting elements being electrically coupled to one another;

an elongated support arranged to surround said plurality of lighting elements along the predetermined lighting path, said elongated support having a predetermined cross-sectional configuration;

an attachment arrangement coupled to said elongated support for facilitating attachment of said elongated support with said plurality of lighting elements therein to the mounting surface; and a first coupler having first and second elongated coupler members each having respective first and second portions, said respective first portions being fixed to said attachment arrangement whereby said respective second portion extend freely substantially transversely bilaterally therefrom.

2. The flexible lighting arrangement of claim 1, wherein there is further provided a second coupler configured cross-sectionally to accommodate therewithin said first and second elongated coupler members of said first coupler, said first and second couplers being configured to interengage with one another.

3. The flexible lighting arrangement of claim 2, wherein said first and second elongated coupler members form a T-shaped cross-sectional configuration, and said second coupler has a correspondingly C-shaped configuration for containing said first coupler.

4. The flexible lighting arrangement of claim 3, wherein said C-shaped second coupler comprises a base portion, a pair of distal wall portions extending transversely from said base portion, and a pair of inwardly directed flange portions extending from respective ones of said pair of distal wall portions.

5. The flexible lighting arrangement of claim 2, wherein said base portion is provided with an affixing arrangement for attaching said second coupler to the mounting surface.

6. The flexible lighting arrangement of claim 1, wherein said cross-sectional configuration of said elongated support is substantially round.

7. The flexible lighting arrangement of claim 1, wherein the mounting surface is penetrable, and said attachment arrangement comprises a web portion configured to penetrate into the mounting surface to effect the attachment of said elongated support to the mounting surface.

8. The flexible lighting arrangement of claim 7, wherein said web portion of said attachment arrangement has attached thereto said first and second elongated coupler members arranged to extend freely and transversely therefrom for securing said web portion to the mounting surface.

9. The flexible lighting arrangement of claim 8, wherein said first and second elongated coupler members are angularly pitched with respect to said web portion to facilitate the penetration of the mounting surface.

* * * * *